United States Patent [19]

Tassitino, Jr.

[11] Patent Number: 5,633,539
[45] Date of Patent: May 27, 1997

[54] UNINTERRUPTIBLE POWER SUPPLY INPUT POWER WALK-IN

[75] Inventor: Frederick Tassitino, Jr., Wake Forest, N.C.

[73] Assignee: Exide Electronics Corporation, Raleigh, N.C.

[21] Appl. No.: 379,344

[22] Filed: Jan. 27, 1995

[51] Int. Cl.[6] ..................................................... H02J 7/00
[52] U.S. Cl. .................... 307/64; 307/65; 307/66; 307/87; 307/58; 307/85; 307/52; 323/908
[58] Field of Search .................... 307/64, 65, 66, 307/87, 58, 85, 52; 323/908

[56] References Cited

U.S. PATENT DOCUMENTS

| | | | |
|---|---|---|---|
| 3,418,559 | 12/1968 | Rolfes | 307/66 |
| 3,935,527 | 1/1976 | Michelet et al. | 323/908 |
| 4,395,639 | 7/1983 | Bring | 307/66 |
| 4,400,661 | 9/1983 | Duley | 307/66 |
| 4,564,767 | 1/1986 | Charch | 307/66 |
| 4,716,511 | 12/1987 | Masaki | 323/908 |
| 4,748,341 | 5/1988 | Gupta | 307/64 |
| 4,782,241 | 11/1988 | Baker et al. | 307/66 |
| 5,041,959 | 8/1991 | Walker | 363/79 |
| 5,142,163 | 8/1992 | Hase | 307/64 |
| 5,194,757 | 3/1993 | Wertheim | 307/87 |
| 5,285,365 | 2/1994 | Yamato et al. | 363/8 |

Primary Examiner—William M. Shoop, Jr.
Assistant Examiner—Kim Lockett
Attorney, Agent, or Firm—Woodcock Washburn Kurtz MacKiewicz & Norris LLP

[57] ABSTRACT

An UPS system provides a true input power walk-in. The UPS adjusts the level of power supplied from an input port to a load on an output port as a function of a level of current of a power supplied from a backup power source to the load on the output port.

19 Claims, 4 Drawing Sheets

UNINTERRUPTIBLE POWER SUPPLY INPUT POWER WALK-IN

FIELD OF THE INVENTION

The present invention relates to high power uninterruptible power supplies ("UPS"), and more particularly to an improved input power walk-in of an UPS.

BACKGROUND OF THE INVENTION

A UPS is used to provide a constant source of power to a critical load. A UPS generally receives power at an input port from a utility power source and supplies power from the input port to an output port for critical loads. When the power at the input port from the utility power source is disrupted, even for a brief interval, the UPS provides power to the output port adequate for the demand of the critical loads from a secondary power source such as a battery or capacitor. When the utility power is restored at the input port, the UPS, again, supplies power to the load on the output port from the input port. In addition, an emergency generator may be connected to the input port of the UPS. For example, if the utility power is not restored quickly, an emergency generator may be connected to the input port of the UPS to prevent the secondary power source (battery) from becoming depleted.

Utility companies and customer sites require that, in a high power UPS, the UPS not instantaneously switch the source of power for the load on the output port from the secondary power source to the input port. The output port of a high power UPS may provide, for example, 80 kW (kilowatts) of power for critical loads. This level of instant demand from the utility source may cause damage to the utility's delivery vehicles, e.g., transformers, trip feeder breakers, and could interact with other devices using the input feed to the input port. In addition, if an emergency generator is placed on the input port, the level of demand may trip a breaker on the generator. As a consequence, customer require that the level of power demand on the input port (such as from a utility source or an emergency generator) be increased on a gradual basis. This is known in the art as a "power walk-in".

Known high power UPS's provide a "power walk-in" from the input port by measuring the current level at the input port. The UPS gradually increases the power supplied from the utility source to the load on the output port based on the measured current level at the input port. The power supplied from the input port to the load on the output port, however, varies according to the input voltage, input current and input power factor.

For example, UPS's typically employ a rectifier to control to level of power supplied from the input port to the output port and employ input filters to smooth signals from the input port. The power factor of a rectifier normally changes from no load to full load. The input filters also affect the input power factor. As a consequence, the UPS can not accurately determine and, thus, control, the level of power supplied from the input port by a utility to the load on the output port. Therefore, prior art UPS's can not provide a strictly controlled input power walk-in or "true" input power walk-in.

In addition, prior art input power walk-in circuitry is complicated. In particular, the circuitry, first, includes three current transformers. The three current transformers measure the input current, one for each of the three phases of AC power supplied by the utility. The circuitry further usually includes at least 6 operational amplifiers ("OPAMPS") and 16 resistors and/or capacitors. The OP AMPS, resistors, and capacitors rectify the three measured currents and average the rectified currents together to generate an indication of the input current. This circuitry is complex and expensive. Therefore, a need exists for an input power walk-in process and "power walk-in" circuitry that provides a true "power walk-in" and is less complicated than the prior art.

SUMMARY OF THE INVENTION

An object of the present invention is to provide an input power walk-in process which provides a true power walk-in for an UPS. Another object of the present invention is to provide power walk-in circuitry for an UPS that is less complicated than prior art walk-in circuitry.

According to one embodiment of the invention, an input power walk-in is performed by monitoring the current level of power supplied from a backup power supply to the load on the output port. In particular, the level of current of power supplied by the backup power supply to the load on the output port is determined. Then, the power supplied from the input port to the load on the output port is controlled based on the determined level of current of the power supplied to the load on the output port from the backup supply.

Using this embodiment of the invention, a true power walk-in can be achieved because the power supplied from the input port to the load on the output port may be determined from the level of current of the power supplied from the backup power source to the load on the output port. In particular, the voltage level of the power supplied from backup power source to the load on the output port is known. Thus, if the level of current of the power supplied from the backup power source is known, the power level supplied from the backup power source can be determined. The power supplied from the input port to the output port is then equal to the total power supplied to the load on the output port less the power supplied from the backup power source to the load on the output port.

In one embodiment of the invention, power having alternating current is supplied from a utility to the input port. In this embodiment, the power supplied to the input port is transformed and rectified to generate power having direct current and a voltage level substantially identical to the voltage level of the backup power source. The level of current and the known level of voltage from the backup power supply are used to control the level of power supplied to the load by the backup power supply and the level of power supplied by the input power source. Thus, the source of power to the output port can be controlled.

In another embodiment of the invention, a backup power source current level signal is generated whose voltage is representative of the level of current of the power supplied from the backup power source to the load on the output port. In this embodiment, a current sensor ("DCCT") is used to generate the backup power source current level signal. In addition, in this embodiment, the level of the voltage of the signal is linearly reduced by a voltage divider consisting of resistors where the resultant level of voltage is an operating range of a controller used in the power walk-in process.

BRIEF DESCRIPTION OF THE DRAWINGS

FIG. 1 is a block diagram of a prior art UPS which provides an input power walk-in.

FIG. 2 is a block diagram of an exemplary configuration of an UPS of the present invention which provides an input power walk-in.

DETAILED DESCRIPTION OF PREFERRED EMBODIMENTS

Figure 1:
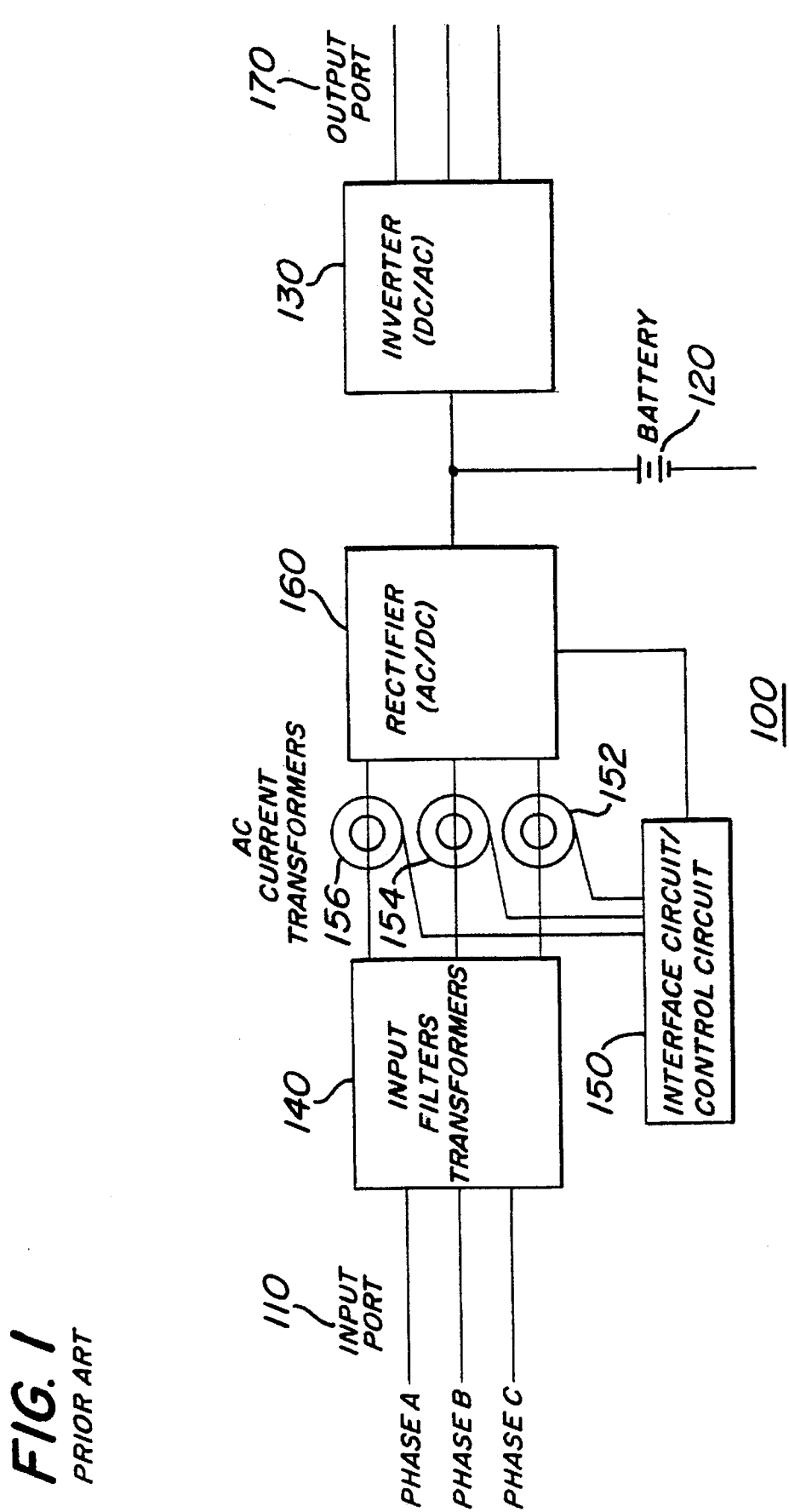

A block diagram of a prior art high power UPS system 100 which includes circuitry for performing an input power walk-in is explained with reference to FIG. 1. As shown in this Figure, the system 100 includes an input port 110, input filters and transformers 140, rectifier 160, inverter 130, output port 170, battery or backup power source 120, interface circuit and control circuit 150, and three Alternating Current ("AC") Current Transformers ("CT") 152, 154, and 156.

During the normal operation of the UPS, a three phase, AC signal is supplied to the input port 110 on three lines (Phase A, Phase B, and Phase C) from a primary power source such as from a utility company. The input filters and transformers 140 filter and transform the three phase, AC signal supplied to the input port 110 to a signal having a voltage level substantially equivalent to the voltage level of the backup power source or battery 120. The rectifier 160 converts the filtered and transformed three phase, AC signal processed by the input filters and transformers 140 to a DC signal. In normal operation, the DC signal charges the backup power source or battery 120 and supplies power to any loads connected to the output port 170. The inverter 130 converts the DC signal generated by the rectifier 160 to a three phase, AC signal. The output port 170 provides the three phase, AC signal generated by the inverter 130 to attached loads.

When the three phase AC signal that is supplied to the input port fails, power for loads on the output port 170 is supplied by the backup power source 120. The input port 110 does not provide any output port power. When power returns on the input port 110, the interface and control circuit 150 can not immediately direct the rectifier 160 to produce a DC voltage having a power level sufficient for the loads on the output port and to charge the backup power source or battery 120 from the filtered and transformed three phase, AC signal because the loads on the output port 170 may be significant (for example 80 kilowatts). As noted above, this instantaneous load on the input port could cause feeder breakers to trip, generators problems and interaction with other equipment connected to the input three phase AC source.

As a consequence, power from the input port 110 to the output port 170 is walked in. The AC, current transformers ("CT") 152, 154 and 156 are used during an input power walk-in process. The AC, CT 152,154 and 156 generate CT signals whose voltage levels are representative of the current on each of the three phases of the filtered and transformed AC signal. The interface and control circuit 150 rectifies and averages together the CT signals produced by the three phase AC current transformers 152, 154 and 156 to generate an average CT signal whose voltage level is representative of the level of current of the filtered and transformed three phase, AC source. The averaged CT signal is used to monitor the level of current so that the rectifier 160 can be controlled to gradually increase the input port current level over the power walk-in time period. In particular, when the three phase AC signal that is supplied to the input port returns, the power supplied from the input port to the output port is gradually increased over time until the input port provides all of the power for the output port.

The average CT signal whose voltage level is representative of the input current level is used to control the input port power level so that the input port power level is increased gradually over time. A maximum threshold of the average CT signal is increased from zero to full load over a time period known as the power walk-in time. When the voltage level of the average CT signal indicates that the current level of the three phase, AC signal is above the specified maximum threshold, the rectifier 160 DC voltage level is reduced to lower the amount of current (and therefore power) provided by the input port. When the voltage level of the average CT signal indicates that the current level of the three phase, AC signal is below the specified maximum threshold, the rectifier 160 DC voltage level is increased to raise the amount of current (and therefore power) provided by the input port.

In summary, the interface circuit and control circuit 150 generates the average CT signal whose voltage level is representative of the average current of the filtered and transformed three phase AC power signal from the outputs of the three AC current transformers 152, 154, and 156. During an input power walk-in, the circuit 150 directs the rectifier 160 to limit the level of current supplied from the filtered and transformed three phase, AC signal based on the average CT signal so that the level of current supplied from AC signal to the load on the output port 170 is increased gradually to prevent customer site problems.

As noted above, the power supplied from the input port 110 to the load on the output port 170 can not be determined from only the average current level of the AC signal. The power supplied from the input port 110 to the load on the output port 170 is a function of the voltage level, power factor and current level of the AC signal. The interface circuit, however, only determines the current level of the AC signal from the average CT signal where the voltage level of the CT signal is representative of the average current level of the AC signal. As a consequence, the interface circuit 150 can not determine the level of power supplied from the input port 110 to the load on the output port 170.

Thus, the UPS 100 can not accurately control the level of power supplied from the input port 110 to the load on the output port 170. As a consequence, the UPS 100 (via the interface circuit and control circuit 150) can not provide a true power walk-in of the input port. The UPS 100, instead, provides a current walk-in of the AC signal, i.e., it controls the level of current supplied from the filtered and transformed three phase, AC signal to output port 170 via the rectifier 160.

In addition, in order to perform the "current" walk-in process, the interface circuit portion of the interface circuit and control circuit 150 requires complex circuitry. The circuitry rectifies and averages together the rectified signals generated by the three AC current transformers. This circuitry usually includes 6 operational amplifiers and 16 resistors and/or capacitors. Due to the complexity of this circuitry, the circuitry is potentially subject to failure or may be require frequent routine maintenance.

Figure 2:
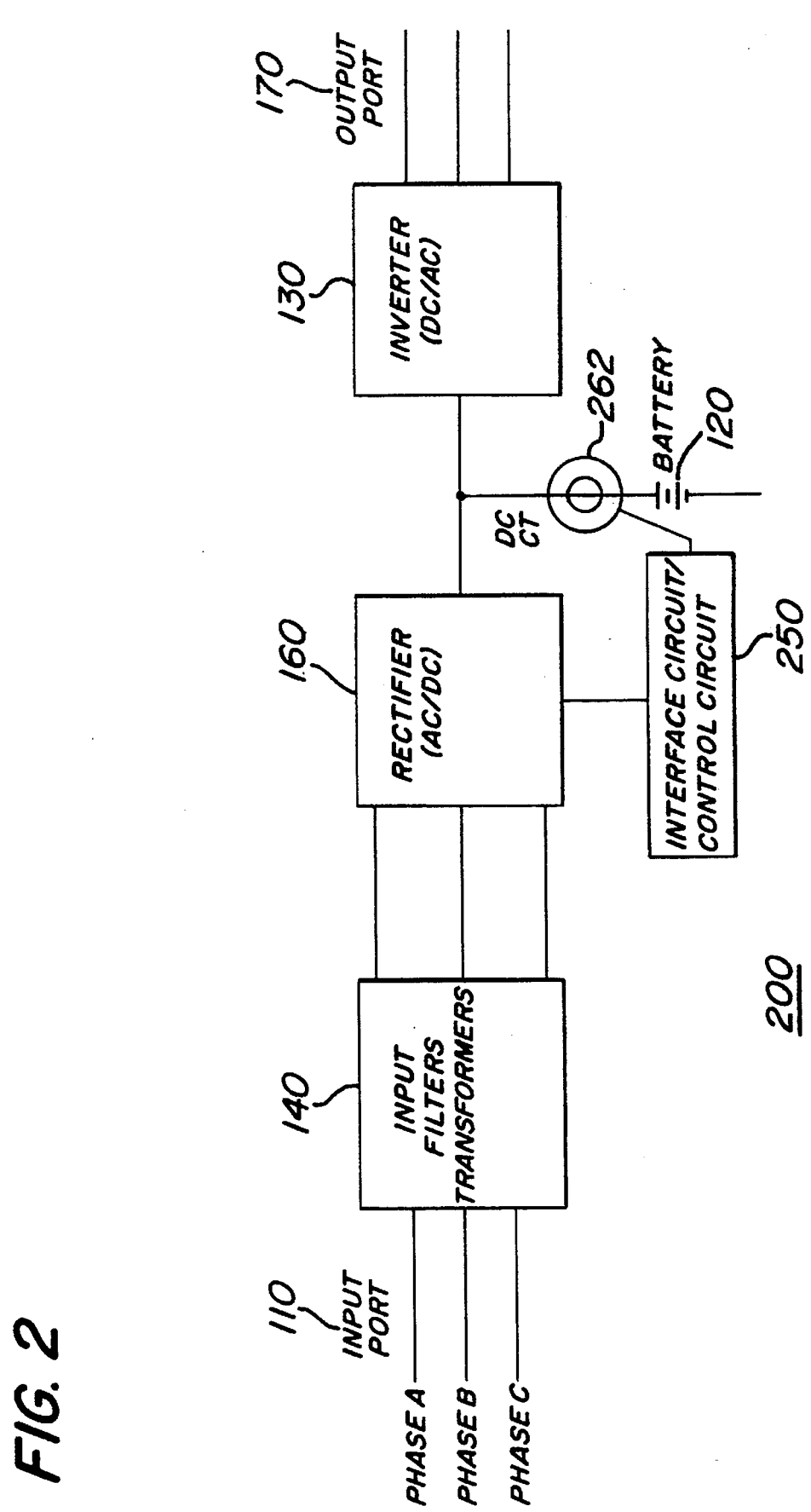

A preferred embodiment of the invention which provides a true power walk-in is shown in FIG. 2. As shown in this Figure, the system 200 also includes the input port 110, the output port 170, the input filters and transformers 140, rectifier 160, and the backup power source or battery 120. In addition, the system 200 includes an interface circuit and control circuit 250 and a single direct current current sensor ("DCCT") 262. Typically, a DC current sensor 262 is used in common UPS systems for monitoring the backup power supply source current level. Therefore, the preferred embodiment of the invention does not require the addition of this component while removing other components (such AC CTs) from the UPS system. In normal operation, the UPS system 200, shown in FIG. 2, operates in the same manner as described above for the UPS system 100 shown in FIG. 1. For example, in normal operation, power supplied from a primary power source connected to the input port is sufficient to charge the backup power source or battery 120 and support any loads connected to the output port 170 of the UPS 200.

In UPS 200, the DC current sensor 262 measures the level of current of the power supplied to the backup power source or battery 120 and generates a DC signal. The voltage level of the DC signal is representative of the level of current of the power supplied to the backup power source or battery 120. Thus, in the normal operation of the UPS 200, the level of current (measured by the DC current sensor 262) would be zero or positive because normally the battery or backup power source 120 is charged by the rectifier 160 (i.e., is receiving current). In the preferred embodiment of the invention, the DC current level is negative when the battery or backup power source 120 is supplying current to a load on the output port 170.

The interface portion of the interface circuit and control circuit 250 generates a signal with a linearly reduced voltage level from the DC signal generated by the DC current sensor 262. The interface portion includes three resistors which form a voltage divider. The voltage divider linearly reduces the voltage level of the DC signal (whose voltage is representative of the level of current supplied from the backup power source 120 to the load on the output port 170). In particular, the resistors are selected so that the level of voltage produced by the voltage divider from the DC signal is within a range that is acceptable to the control portion of circuit 250, for example, in the range of ±5 volts.

The control portion of the circuit 250 of the present invention monitors the voltage level of the signal produced by the voltage divider (which is representative of the current supplied from the backup power source or battery 120 to the load on the output port 170). The DC current of the backup power supply or battery 120 is used to increase or decrease the rectifier 160 voltage in order to control the input port power level. The interface and control circuit 250 directs the rectifier 160 to gradually increase the level of power supplied from the input port 110 to the load on the output port 170 by monitoring the level of current of the power supplied from the backup power source or battery 120 to the load on the output part 170.

The level of power supplied to the load on the output port 170 is equal to the sum of the level of power supplied by the backup power source or battery 120 to the load on the output port 170 and the level of power supplied from the input port 110 to the load on the output port 170. The power supplied from the backup power source or battery to the load on the output port 120 has a known voltage level. As a consequence, the level of power supplied from the backup power source or battery 120 to the load on the output port 170 can be accurately determined by measuring the current level of the power supplied from the battery 120 to the load on the output port 170. In particular, the level of power supplied from the battery 120 to the load on the output port 170 is equal to measured current level multiplied by the voltage level of the battery 120.

Therefore, the level of power supplied from the input port 110 to the load on the output port 170 can be determined.

The total level of power supplied to the load on the output port 170 is known and the level of power supplied from the battery 120 to the load on the output port 170 can be determined. The level of power supplied from the input port 110 to the output 170 is equal to the difference of the total level of power supplied to the load on the output port 170 and the level of power supplied from the backup power source 120 to the load on the output port 170. As a consequence, the level of power supplied from the input port 120 to the load on the output port 170 can be accurately determined by monitoring the level of current of the power supplied from the backup power source or battery 120 to the load on the output port 170. This enables accurate control of the level of power supplied from the input port 110 to the load on the output port 170 during an input power walk-in, in particular, it enables the UPS 200 to perform a "true" input power walk-in.

When the three phase AC signal that is supplied to the input port fails, power for a load on the output port 170 is supplied by the backup power source 120. The input port 110 does not provide any output port power. When power returns on the input port 110, the interface and control circuit 250 can not immediately direct the rectifier 160 to produce a DC voltage having a power level sufficient for the loads on the output port and to charge the backup power source or battery from the filtered and transformed three phase, AC signal because the loads on the output port 170 may be significant (for example 80 kilowatts). As noted above, this instantaneous load on the input port could cause feeder breakers to trip, generators problems and interaction with other equipment connected to the input three phase AC source.

Thus, when three phase AC power returns to the input port, the power supplied from the input port 110 to a load on the output port 170 is gradually increased over time until the input port 110 provides all of the power for a load on the output port 170. The DC current signal whose voltage level is representative of the backup power supply current level is used to control the input port power level. The backup power supply voltage is known and therefore the backup power supply power level is known. The input port power level is increased gradually over time by controlling the backup power source power level. Controlling either the DC current level or DC power level of the backup source will result in controlling the backup power supply power level.

A maximum threshold of backup power is decreased from full load to zero over a time period known as the power walk-in time. The power level to a load on the output port 170 is constant. Therefore, as the power level of the backup source 120 is decreased, the power level of the input port 110 will increase by the same amount. As a consequence, the input three phase AC source power factor is irrelevant to the input power walk-in.

As noted above, the DC current signal is negative when power is being supplied by the backup power source 120. As the DC current signal becomes less negative, the backup power supply power level is reduced and the input source power level is increased. For example, when the voltage level of the DC current signal indicates that the absolute value of the backup power supply power level is above a specified minimum threshold, the rectifier DC voltage level is increased to increase the amount of power provided by the input port 110 and to decrease the amount of power provided by the backup power supply source 120. When the voltage level of the DC current signal indicates that the backup power supply power level is below the specified minimum threshold, the rectifier DC voltage level is decreased to decrease the amount of power provided by the input port and to increase the amount of power provided by the backup power supply source 120.

Figure 3:
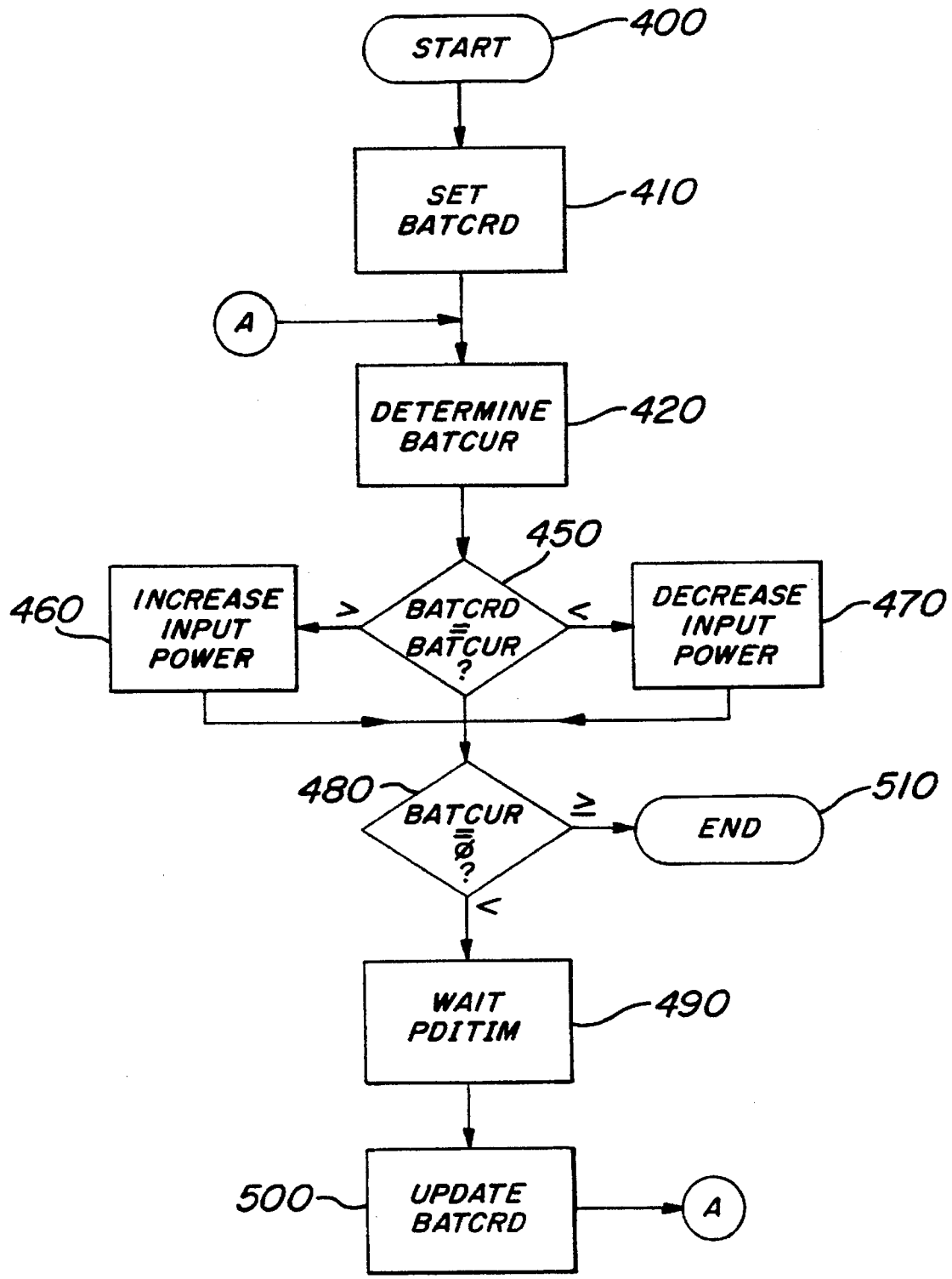
FIG. 3 is a flowchart of an exemplary input power walk-in process according to the present invention.

A detailed description of an exemplary input power walk-in process according to the present invention is provided with reference to the flowchart shown in FIG. 3. For illustration purposes, at the start 400 of the process shown in FIG. 3, the backup power source 120 is supplying all the power to a load on the output port 170 and the level of power is 540 volts and 160 amperes (approximately 80 KW). In the first step of the exemplary process, the desired level of current (BATCRD) supplied from the backup power source 120 to a load on the output port 170 is set. In this illustration, BATCRD is initially set to −160 amperes plus the desired increase in current (BATINC). In the exemplary embodiment of the invention, BATINC is 8 amperes/second and BATCRD is updated 300 times per second. As a consequence, BATCRD is increased 0.0267 amperes every cycle of the process shown in FIG. 3. During the next step 420, the level of current (BATCUR) supplied from the backup power source 120 to a load on the output port 170 is determined.

As noted above, the DC current signal has a voltage level that is representative of BATCUR. Initially, BATCUR is still equal to 160 amperes. Then, in step 450, the desired level of current, BATCRD, is compared to the measured level, BATCUR. If BATCRD is greater than BATCUR (closer to zero in the preferred embodiment), then the power supplied from the input port 110 to a load on the output port 170 is increased, step 460. If BATCRD is less than BATCUR, then the power supplied from the input port 110 to a load on the output port 170 is decreased, step 460. In this example, BATCRD (−160+0.0267 amperes) is greater than BATCUR (160 amperes). As a consequence, the power supplied from the input port 110 to a load on the output port 170 is increased.

When the BATCUR is zero, the input power walk-in process is complete because the backup power source 120 is then not supplying current (or power) to a load on the output port 170. If BATCUR is greater than or equal to zero, step 480, the process shown in FIG. 3 ends, step 510. Otherwise, BATCRD is incremented again, step 500, after waiting until the update cycle is complete, step 490. As noted above, in this preferred embodiment of the invention, BATCRD is updated 300 times per second. Thus, control remains at step 490 until 1/300 of second has passed since control was last at step 490.

Then BATCRD is updated by adding the 0.0267 amperes to BATCRD which corresponds to increasing current 8 amperes per second. As noted above, the current supplied to the load on the output port 170 is 160 amperes. As a consequence, the total time required to perform this exemplary input power walk-in is approximately 20 seconds (160 amperes/8 amperes/sec).

Figure 4:
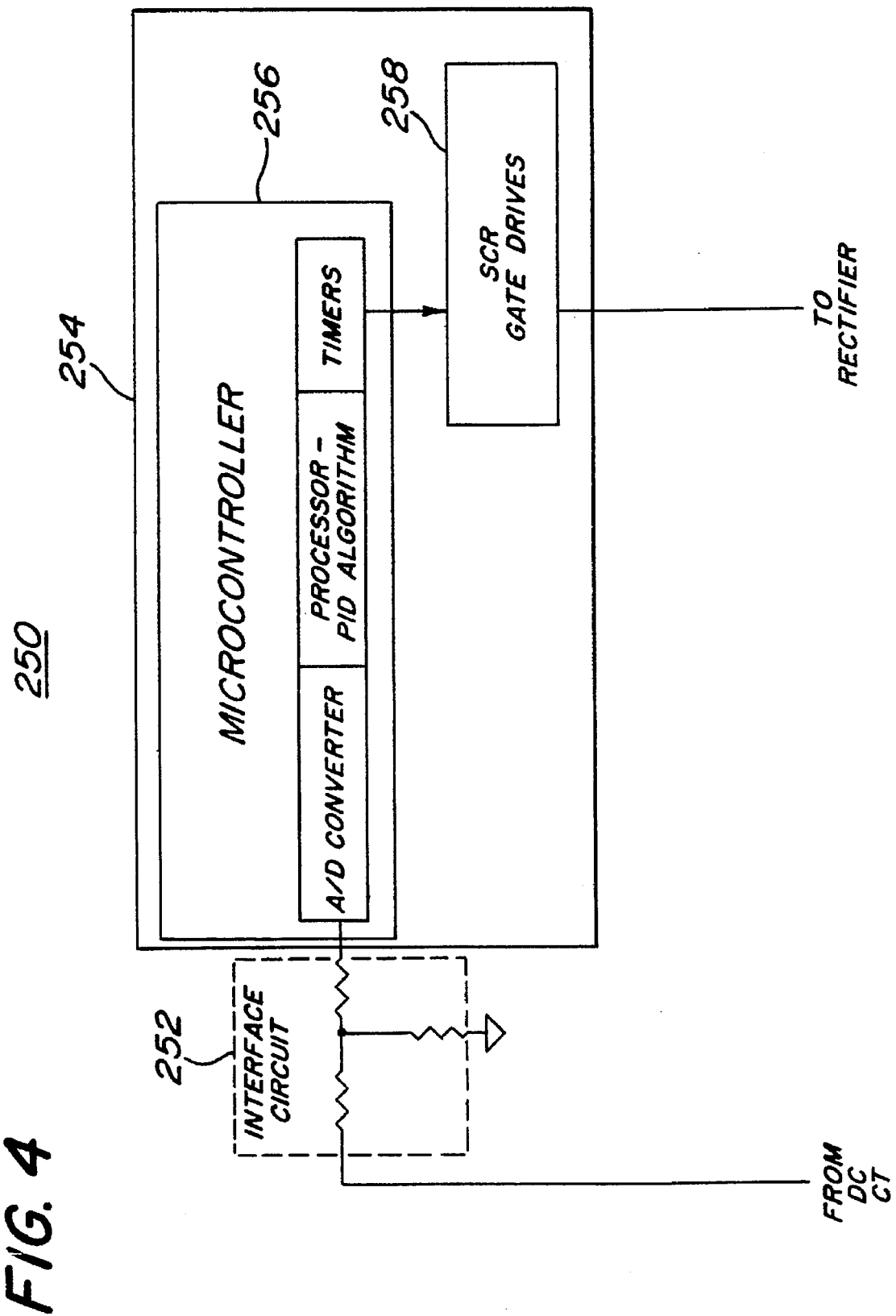
FIG. 4 is a schematic for an interface circuit and control circuit of the UPS shown in FIG. 2.

An exemplary interface circuit and control circuit 250 for the UPS system 200 for performing the power walk-in process shown in FIG. 3 and discussed above is shown in FIG. 4. As shown in this Figure, the circuit 250 includes an interface circuit 252 and control circuit 254 where the interface circuit 252 includes three resistors and the control circuit 254 includes a microcontroller 256 and silicon controlled rectifier ("SCR") gate drives 258. The interface circuit 252 receives the DC current signal from the DC current sensor 262 where the voltage level of the signal is representative of the current level of the power supplied to the load on the output port 170 from the backup power source or battery 120 (FIG. 2). The three resistors of the interface circuit 252 linearly reduce the voltage level of the DC current signal to a level that is acceptable to the microcontroller 256 of the control circuit 254, in particular, to the analog to digital ("A/D") converter of the microcontroller 256. The control circuit 254 controls the rectifier 160 via the SCR gate drives 258 as a function of the signal received from the interface circuit.

In detail, the microcontroller 256 of the control circuit 254 includes an A/D converter, processor for executing a software or firmware algorithm, and timers. The processor uses the A/D converter, timers and SCR gate drives 258 to complete the power walk-in process of FIG. 3. The A/D convertor converts the analog signal generated by the interface circuit 252 to a digital signal whose values represent the level of current of the power supplied to the load on the output port 170 from the backup power source or battery 120. The processor employs an algorithm which evaluates the received digital signal and controls the rectifier 160 according to the power walk-in process shown in FIG. 3. The timers of the microprocessor 256 directly control the rectifier power devices (SCR's) 258

The interface circuit 252, microcontroller 256 and SCR gate drives 258, along with the rectifier 160 and DC current sensor 262, form a feedback loop between the backup power source or battery 120, input port 110 and rectifier 160 which is used to control the input power walk-in process as shown in FIG. 3. As noted above, the DC current sensor 262 generates a DC signal whose voltage level is representative of the level of current of the power supplied to the load on the output port 170 from the backup power source or battery 120. The interface circuit 252 reduces the voltage level of the DC signal where the resistors of voltage divider are selected so that the voltage level of the signal produced by the interface circuit 252 from the DC signal is within a range that is acceptable for the A/D converter of the microcontroller 256, for example, in the range of ±5 volts.

The processor of the microprocessor 256 receives the digital signal from the A/D converter where the values of the signal are representative of the level of current of the power supplied from the backup power source or battery 120 to the load on the output port 170. When a value of the signal indicates that the level of current is greater than a specific minimum threshold, i.e., indicating that the backup power source or battery 120 is supplying too much power to the load on the output port 170, the microcontroller 256 via the SCR gate drives 258, switches the power devices, SCR'S 258, in a manner that increases the DC voltage level causing less power to be supplied from the backup power source 120 (step 460).

When a value of the DC current signal indicates that the level of current is less than the minimum threshold, i.e. indicating that the backup power supply or battery 120 is providing too little power to the load on the output part 170, the microcontroller 256 via the SCR gate drives 258, switches the power devices, SCR'S, in a manner that decreases the DC voltage level causing more power to be supplied from the backup power source 120 to the load on the output port 170 (step 470). The microcontroller performs the power walk-in process until all of the loads on the output port 170 are supplied power from the input port (step 480). In conclusion, increasing and decreasing the input power are performed by the processor in conjunction with the timers of the microprocessor 256, SCR gate drives 258, and rectifier 160.

Although the invention has been described in terms of an exemplary embodiment, the spirit and scope of the appended claims are unlimited by any details not expressly stated in the claims. For example, the backup power source may not be a battery, but instead a fossil fuel generator. In this embodiment, the rectifier 160 is controlled to generate power only sufficient to supply any loads connected to the output port 170 of the UPS system 200.

What is claimed is:

1. An input power walk-in method for an uninterruptible power supply ("UPS") having an input port for receiving power, a backup power source, and an output port for providing power to a load, the method comprising the steps of:

(a) determining a level of current of power supplied from the backup power source to the load on the output port; and (b) controlling a level of power supplied to the load on the output port from the input port as a function of the level of current of the power supplied from the backup power source to the load on the output port so that the level of the power supplied to the load on the output port from the input port is gradually increased over a predetermined interval of time while maintaining the total level of power supplied to the load on the output port substantially constant.

2. The input power walk-in method as recited in claim 1, wherein step (b) comprises the steps of:

(i) comparing the determined level of current of power supplied from the backup power source to the load on the output port to a desired level of current; and (ii) controlling a level of power supplied to the load on the output port from the input port as a function of a result of the comparison.

3. The input power walk-in method as recited in claim 2, wherein step (ii) comprises the steps of:

increasing a level of power supplied to the load on the output port from the input port if the determined level of current of power supplied from the backup power source to the load on the output port is greater than the desired level of current; and decreasing a level of power supplied to the load on the output port from the input port if the determined level of current of power supplied from the backup power source to the load on the output port is less than the desired level of current.

4. The input power walk-in method as recited in claim 1 wherein the step of determining the level of current of the power supplied from the backup power source to the load on the output port comprises:

generating a current signal whose voltage level is representative of the level of current of the power supplied from the backup power source to the load on the output port.

5. The input power walk-in method as recited in claim 4 further comprising the step of providing a current sensor and wherein the current sensor is employed to carry out the step of generating the current signal.

6. The input power walk-in method as recited in claim 5, further comprising the step of:

linearly reducing the voltage level of the current signal generated by the current sensor.

7. The input power walk-in method as recited in claim 6 further comprising the step of providing a voltage divider circuit and wherein the voltage divider circuit is employed to carry out the step of linearly reducing the voltage level of the current signal generated by the current sensor.

8. The input power walk-in method as recited in claim 1 further comprising the step of providing a controller and wherein the controller is employed to carry out the step of controlling the level of power supplied to the load on the output port from the input port.

9. The input power walk-in method as recited in claim 8 wherein the voltage level of the current signal is linearly reduced by the voltage divider circuit to a voltage level which is within an operating range of the controller.

10. An input power walk-in circuit for an uninterruptible power supply ("UPS") having an input port for receiving power, a backup power source, and an output port for providing power to a load, the circuit comprising:

current determination means for determining a level of current of power supplied from the backup power source to the load on the output port; and power controller means for controlling a level of power supplied to the load on the output port from the input port as a function of the level of current of the power supplied from the backup power source to the load on the output port so that the level of the power supplied to the load on the output port from the input port is gradually increased over a predetermined interval of time while maintaining the total level of power supplied to the load on the output port substantially constant.

11. The input power walk-in circuit as recited in claim 10, wherein power controller means includes:

means for comparing the determined level of current of power supplied from the backup power source to the load on the output port to a desired level of current; and means for controlling a level of power supplied to the load on the output port from the input port as a function of a result of the comparison.

12. The input power walk-in circuit as recited in claim 11, wherein the power controller means further includes:

means for increasing a level of power supplied to the load on the output port from the input port if the determined level of current of power supplied from the backup power source to the load on the output port is greater than the desired level of current; and means for decreasing a level of power supplied to the load on the output port from the input port if the determined level of current of power supplied from the backup power source to the load on the output port is less than the desired level of current.

13. The input power walk-in circuit as recited in claim 10 wherein the current determination means includes:

means for generating a current signal whose voltage level is representative of the level of current of the power supplied from the backup power source to the load on the output port.

14. The input power walk-in circuit as recited in claim 10 wherein the current determination means includes a current sensor.

15. The input power walk-in circuit as recited in claim 14, further comprising:

linear reduction means for linearly reducing the voltage level of the current signal generated by the current sensor.

16. The input power walk-in circuit as recited in claim 15 wherein the linear reduction means includes a voltage divider circuit.

17. The input power walk-in circuit as recited in claim 16 wherein the voltage level of the current signal is linearly reduced by the voltage divider circuit to a voltage level which is within an operating range of the voltage controller means.

18. An input power walk-in method for an uninterruptible power supply ("UPS") having an input port for receiving power, a backup power source, and an output port for providing power to a load, the method comprising the steps of:

(a) determining a level of current of power supplied from the backup power source to the load on the output port, including the steps of:

(i) employing a current sensor to generate a current signal whose voltage level is representative of the level of current of the power supplied from the backup power source to the load on the output port, and (ii) employing a voltage divider circuit to linearly reduce the voltage level of the current signal generated by the current transformer to a level which is within an operating range of a controller; and (b) employing the controller to control a level of power supplied to the load on the output port from the input port as a function of the determined level of current of power supplied from the backup power source to the load on the output port so that the level of the power supplied to the load on the output port from the input port is gradually increased over a predetermined interval of time, including the steps of:

(i) comparing the determined level of current of power supplied from the backup power source to the load on the output port to a desired level of current, (ii) increasing a level of power supplied to the load on the output port from the input port if the determined level of current of power supplied from the backup power source to the load on the output port is greater than the desired level of current, and (iii) decreasing a level of power supplied to the load on the output port from the input port if the determined level of current of power supplied from the backup power source to the load on the output port is less than the desired level of current.

19. An input power walk-in circuit for an uninterruptible power supply ("UPS") having an input port for receiving power, a backup power source, and an output port for providing power to a load, the circuit comprising:

current determination means for determining a level of current of power supplied from the backup power source to the load on the output port, including:

means including a current sensor for generating a current signal whose voltage level is representative of the level of current of the power supplied from the backup power source to the load on the output port, and linear reduction means including a voltage divider circuit for linearly reducing the voltage level of the current signal generated by the current transformer; and means for controlling a level of power supplied to the load on the output port from the input port as a function of the determined level of current of power supplied from the backup power source to the load on the output port so that the level of the power supplied to the load on the output port from the input port is gradually increased over a predetermined interval of time, including:

means for comparing the determined level of current of power supplied from the backup power source to the load on the output port to a desired level of current, means for increasing a level of power supplied to the load on the output port from the input port if the determined level of current of power supplied from the backup power source to the load on the output port is greater than the desired level of current, and means for decreasing a level of power supplied to the load on the output port from the input port if the determined level of current of power supplied from the backup power source to the load on the output port is less than the desired level of current.

* * * * *